(12) United States Patent
Chung et al.

(10) Patent No.: US 10,330,184 B2
(45) Date of Patent: Jun. 25, 2019

(54) BOGIE AXLE ASSEMBLY

(71) Applicant: ArvinMeritor Technology, LLC, Troy, MI (US)

(72) Inventors: I-Chao Chung, Troy, MI (US); Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 88 days.

(21) Appl. No.: 15/635,782

(22) Filed: Jun. 28, 2017

(65) Prior Publication Data

US 2017/0299029 A1    Oct. 19, 2017

Related U.S. Application Data

(62) Division of application No. 14/859,603, filed on Sep. 21, 2015, now Pat. No. 9,759,289.

(51) Int. Cl.

| | |
|---|---|
| *F16H 1/28* | (2006.01) |
| *F16H 37/06* | (2006.01) |
| *F16H 37/08* | (2006.01) |
| *F16H 57/08* | (2006.01) |
| *B60B 35/12* | (2006.01) |
| *B61F 5/26* | (2006.01) |
| *B62D 11/10* | (2006.01) |
| *B62D 11/12* | (2006.01) |
| *B61C 9/00* | (2006.01) |

(52) U.S. Cl.
CPC ............. *F16H 37/065* (2013.01); *F16H 1/28* (2013.01); *F16H 37/082* (2013.01); *F16H 57/082* (2013.01); *B60B 35/125* (2013.01); *B61C 9/00* (2013.01); *B61F 5/26* (2013.01); *B62D 11/10* (2013.01); *B62D 11/12* (2013.01)

(58) Field of Classification Search
CPC .... F16H 37/065; F16H 57/082; F16H 37/082; F16H 1/28; B60B 35/125; B61C 9/00; B62D 11/12; B62D 11/10; B61F 5/26
USPC .............................................. 475/18, 28, 213
See application file for complete search history.

(56) References Cited

U.S. PATENT DOCUMENTS

| | | |
|---|---|---|
| 3,315,757 A | 4/1967 | Schlosser |
| 3,504,564 A | 4/1970 | Kell |
| 4,131,169 A | 12/1978 | Eickhoff et al. |

(Continued)

FOREIGN PATENT DOCUMENTS

| | | | |
|---|---|---|---|
| CN | 201947648 U | 8/2011 | |
| DE | 102004021618 A1 * | 12/2005 | ............... F16H 1/28 |

OTHER PUBLICATIONS 177 parts.net, On-Line Catalog of Spare Parts for Caterpillar, Komatsu, Hitachi, John Deere, Tadano, JCB, Volvo, Doosan, Hyundai machinery, Rear Axle (Final Drive) (Planetary Gear) (Differential Lock Type)—Motor Grader GD655-3, Copyright 2012.

(Continued)

*Primary Examiner* — Roger L Pang
(74) *Attorney, Agent, or Firm* — Brooks Kushman P.C.

(57) ABSTRACT

A bogie axle assembly having a housing, a spindle, a drive sprocket unit, and a planetary gear set. The drive sprocket unit may be fixedly disposed on a planet gear carrier of the planetary gear set. The spindle may be fixedly disposed on the housing. The drive sprocket unit may be rotatably supported by at least one roller bearing assembly that may be disposed between the spindle and the drive sprocket unit.

20 Claims, 8 Drawing Sheets

(56) References Cited

U.S. PATENT DOCUMENTS

| | | | |
|---|---|---|---|
| 4,359,914 A | 11/1982 | Meisel, Jr. | |
| 4,441,570 A * | 4/1984 | Damm | F16H 1/28 |
| | | | 180/255 |
| 5,813,938 A | 9/1998 | Forster | |
| 6,299,558 B1 | 10/2001 | Jensen | |
| 6,817,963 B1 * | 11/2004 | Solka | B60K 17/046 |
| | | | 180/372 |
| 6,890,282 B2 * | 5/2005 | Oberstarr | B60K 17/046 |
| | | | 180/255 |
| 7,044,883 B2 * | 5/2006 | Andersson | B60K 17/046 |
| | | | 180/344 |
| 8,313,410 B2 * | 11/2012 | Varela | F16H 1/28 |
| | | | 180/369 |
| 9,834,038 B2 * | 12/2017 | Chung | B60K 17/046 |
| 9,862,231 B2 * | 1/2018 | Varela | B60B 35/125 |
| 2008/0230284 A1 | 9/2008 | Schoon | |
| 2016/0167431 A1 | 6/2016 | Barbir | |

OTHER PUBLICATIONS

5T7158 Final Drive Group—Motor Grader Caterpillar 16H—16H Motor Grader ATS00001-UP (Machine) Powered by 3196 Engine Power Train) 777 Parts, 777 parts.net—on line catalog of spare parts for Caterpillar, Komatsu, Hitachi, John Deere, Tadano, JCB, Volvo, Doosan, Hyundai machinery, copyright 2012.
Disclosure Statement.
European Patent Office, Extended European Search Report for the corresponding European Patent Application No. 16185328.8 dated Feb. 14, 2017.
Chinese Patent Office, First Office Action for Application No. CN201610808937.0, dated May 31, 2018.

\* cited by examiner

BOGIE AXLE ASSEMBLY

CROSS-REFERENCE TO RELATED APPLICATIONS

This application is a continuation/division of U.S. application Ser. No. 14/859,603, filed Sep. 21, 2015, now U.S. Pat. No. 9,759,289, the disclosure of which is hereby incorporated in its entirety by reference herein.

TECHNICAL FIELD

This disclosure relates to a bogie axle assembly.

BACKGROUND

A drive mechanism having bogies is disclosed in U.S. Pat. No. 6,299,558.

SUMMARY

In at least one embodiment, a bogie axle assembly is provided. The bogie axle assembly may include an axle housing, an axle shaft, a planetary gear set, a drive sprocket unit, a spindle, and a first roller bearing assembly. The axle shaft may be disposed in the axle housing and may rotate about an axis. The planetary gear set may be disposed in the axle housing and may include a sun gear, a ring gear, a plurality of planet gears, and a planet gear carrier. The sun gear may be disposed proximate the axle shaft. The ring gear may be disposed proximate the axle housing. The plurality of ring gears may be disposed between the sun gear and the ring gear. The planet gear carrier may be coupled to the plurality of planet gears. The planet gear carrier may have a planet gear carrier hole through which the axle shaft may extend. The drive sprocket unit may be fixedly disposed on the planet gear carrier. The drive sprocket unit may include an inner sprocket and an outer sprocket. The spindle may be fixedly disposed on the axle housing and may have a spindle hole through which the planet gear carrier may extend. The first roller bearing assembly may be disposed on the spindle and may rotatably support the drive sprocket unit.

In at least one embodiment, a bogie axle assembly is provided. The bogie axle assembly may include an axle housing, an axle shaft, a planetary gear set, a drive sprocket unit, a spindle, and a first roller bearing assembly. The axle shaft may be disposed in the axle housing and may rotate about an axis. The planetary gear set may be disposed in the axle housing and may include a sun gear, a ring gear, a plurality of planet gears, and a planet gear carrier. The sun gear may be disposed proximate the axle shaft. The ring gear may be disposed proximate the axle housing. The plurality of planet gears may be disposed between the sun gear and the ring gear. The planet gear carrier may be coupled to the plurality of planet gears and may have a planet gear carrier hole through which the axle shaft may extend. The drive sprocket unit may be fixedly disposed on the planet gear carrier and may include an inner sprocket and an outer sprocket. The spindle may be fixedly disposed on the axle housing and may have a spindle hole that may receive the drive sprocket unit. The first roller bearing assembly may be disposed on the spindle and may rotatably support the drive sprocket unit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
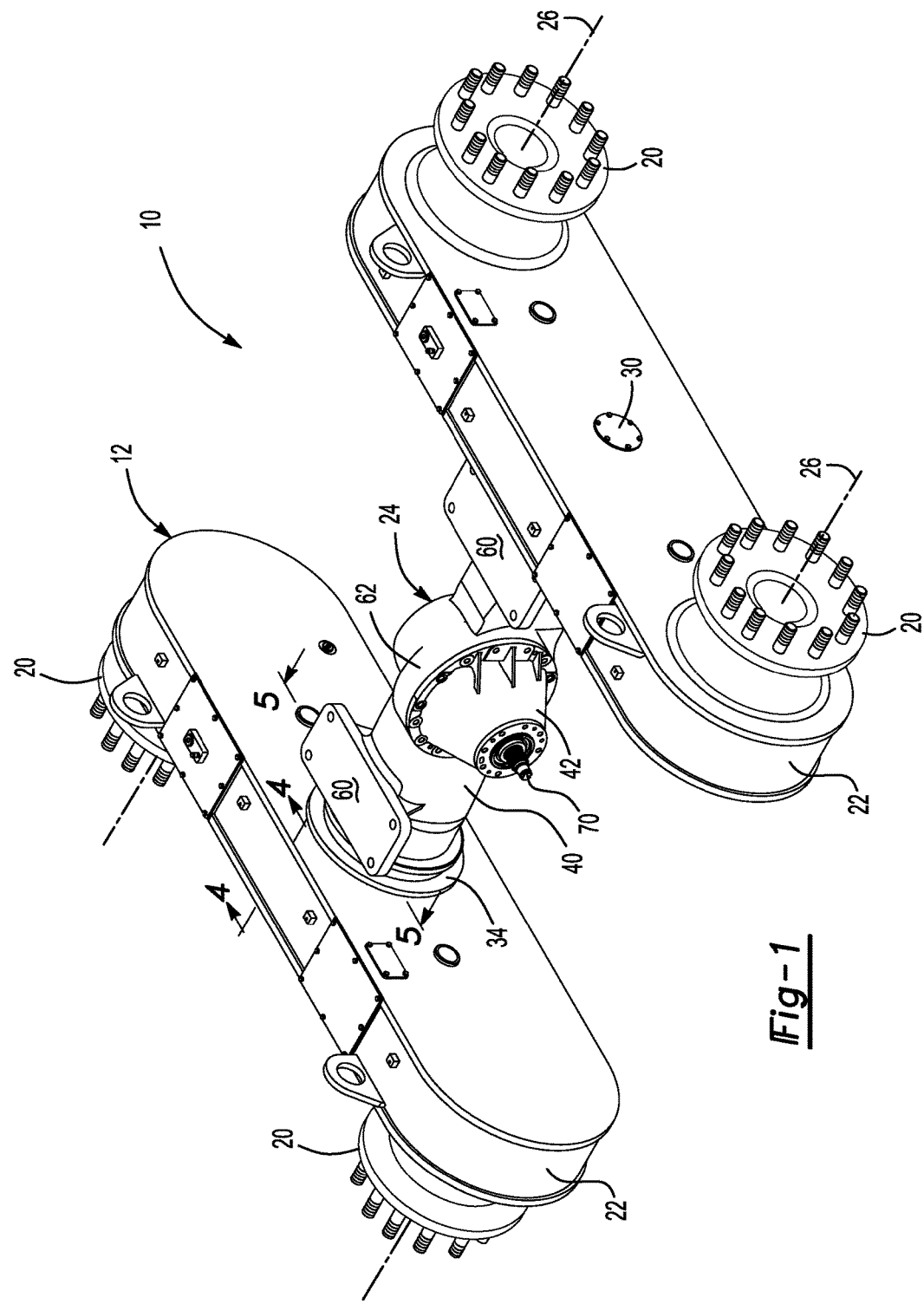
FIG. 1 is a perspective view of a portion of a vehicle having a bogie axle assembly.

Referring to FIG. 1, a portion of vehicle 10 having a bogie axle system 12 is shown. The bogie axle system 12 may be provided with a motor vehicle such as a truck, military transport or weaponry vehicle, or construction equipment like a grader. In at least one embodiment, the bogie axle system 12 may include a plurality of wheel mounts 20, at least one chain housing 22, and a bogie axle assembly 24.

The wheel mount 20 may be configured to facilitate mounting of a wheel assembly to the bogie axle system 12. In at least one embodiment, a wheel assembly may include a tire that may be mounted on a wheel. The wheel mount 20 may be configured to rotate about a wheel axis 26 and may be operatively connected to the bogie axle assembly 24. In the embodiment shown, two wheel mounts 20 are provided with each chain housing 22 such that the wheel mounts 20 may be disposed proximate opposite ends of the chain housing 22 and extend away from the bogie axle assembly 24.

The chain housing 22, which may also be referred to as a chain box, may support one or more wheel mounts 20. The chain housing 22 may be configured as a generally hollow box that may receive sprockets of the wheel mounts 20 and the bogie axle assembly 24, as well as chains that may operatively connect a sprocket of the bogie axle assembly 24 to a sprocket of a corresponding wheel mount 20 that may be disposed inside an associated chain housing 22. In the embodiment shown, two chain housings 22 are provided that are disposed at opposite ends of the bogie axle assembly 24. The chain housing 22 may include one or more removable panels that may be removed from the chain housing 22 to provide access to internal components and facilitate maintenance. For example, each chain housing 22 may include an axle access panel 30 that may be aligned with or disposed along an axis of an axle shaft of the bogie axle assembly 24.

Each chain housing 22 may be mounted to the bogie axle assembly 24 via a corresponding trunnion 34. The trunnion 34 may be fixedly disposed on a corresponding chain housing 22 in any suitable manner, such as with one or more bolts. In addition, the trunnion 34 may be rotatably disposed on the bogie axle assembly 24.

Figure 2:
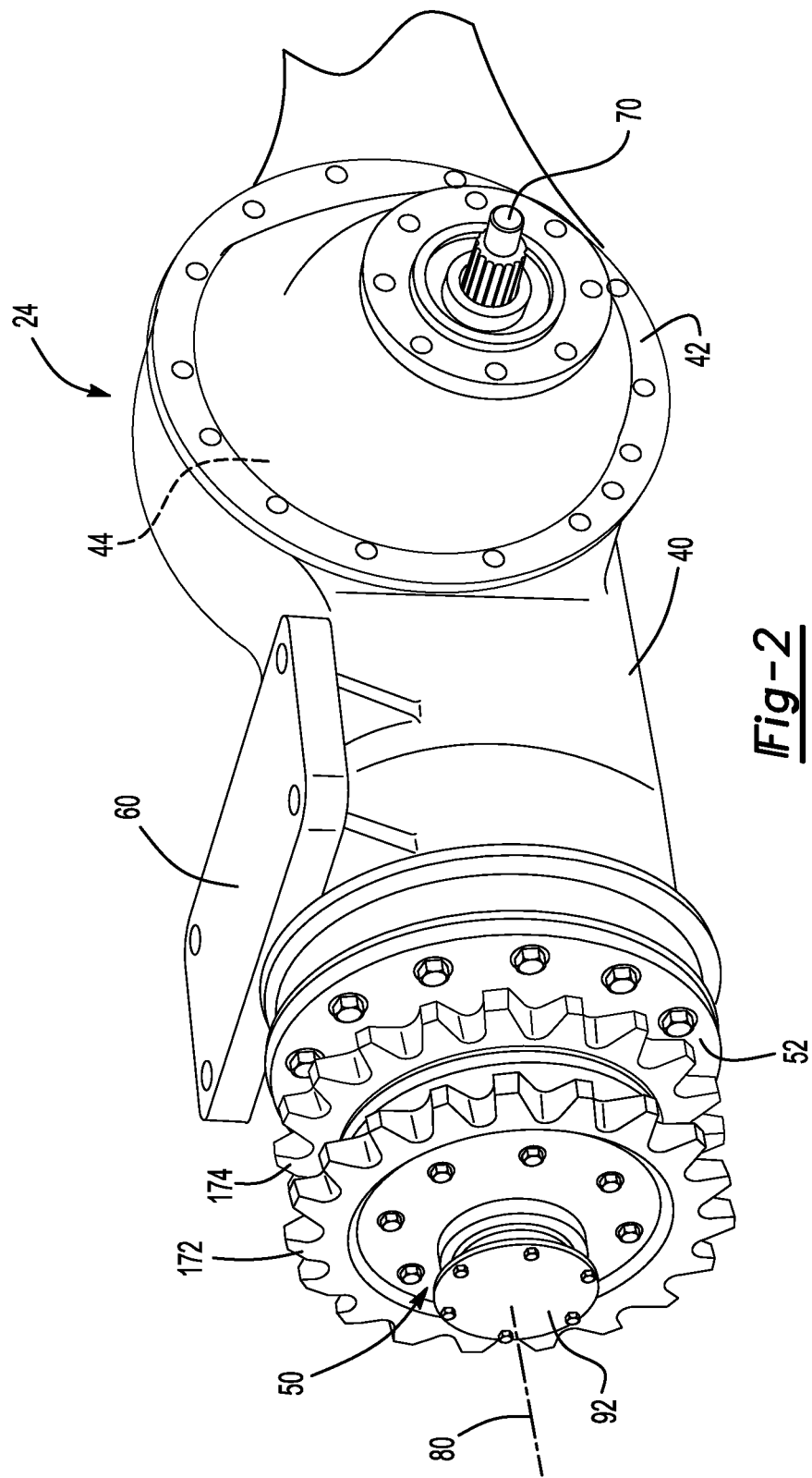
FIG. 2 is a perspective view of a portion of a bogie axle assembly.
Figure 3:
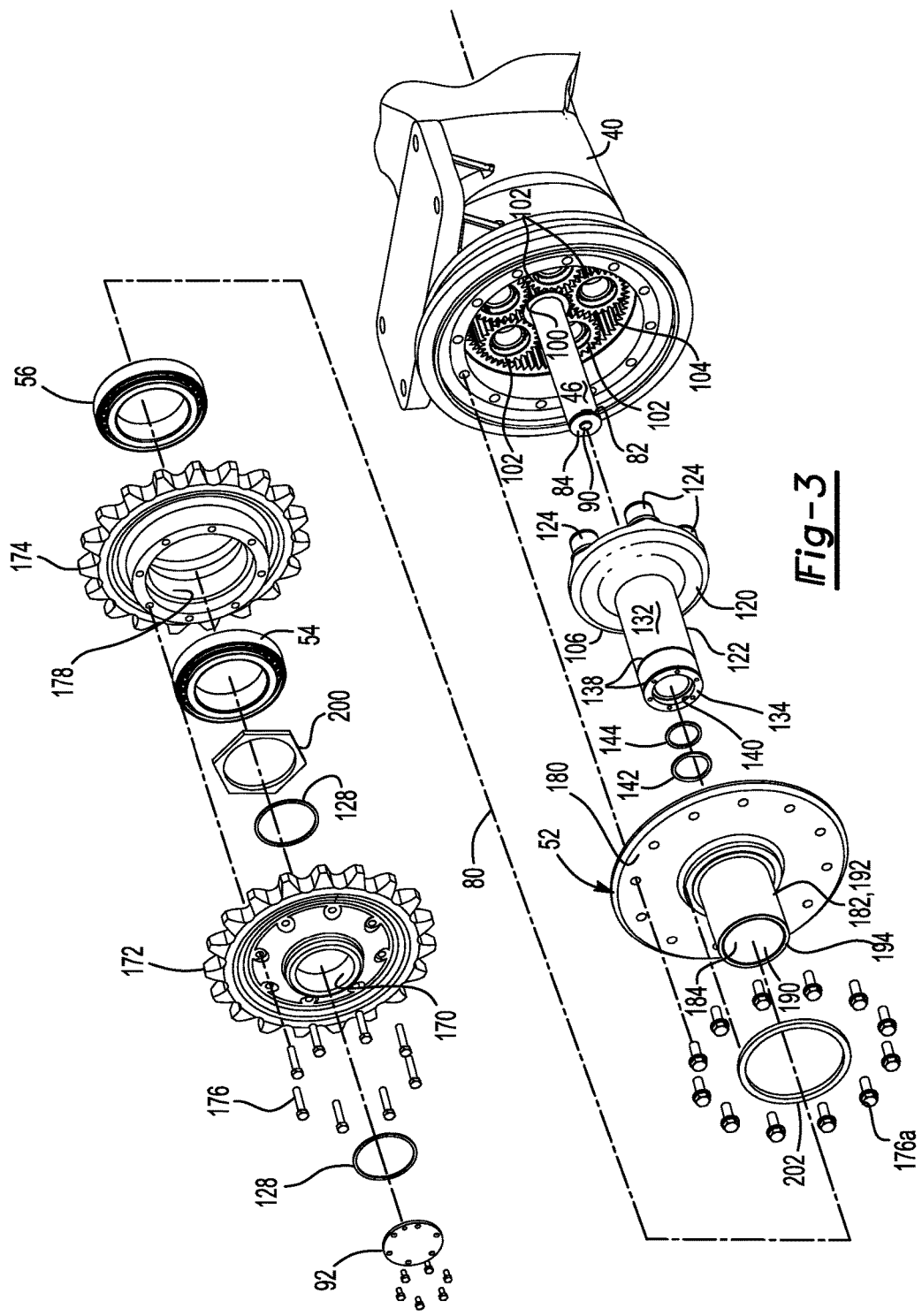
FIG. 3 is an exploded view of a portion of the bogie axle assembly.

The bogie axle assembly 24 may extend between the chain housings 22. In addition, bogie axle assembly 24 may be configured to provide torque to one or more wheel assemblies via the wheel mounts 20. As is best shown in FIGS. 2 and 3, the bogie axle assembly 24 may include an axle housing 40, a differential carrier 42, a differential 44, one or more axle shafts 46, one or more planetary gear sets 48, a drive sprocket unit 50, a spindle 52, a first roller bearing assembly 54, and a second roller bearing assembly 56.

The axle housing 40 may support components of the bogie axle assembly 24. In addition, the axle housing 40 may facilitate mounting of the bogie axle assembly 24 to the vehicle 10, such as via one or more mounting plates 60. The axle housing 40 may also include a center portion 62 that may define an opening that may face toward the differential carrier 42 and a cavity that may receive at least a portion of the differential 44. The center portion 62 may be disposed between the chain housings 22 proximate the center of the axle housing 40. In at least one embodiment, the axle housing 40 may be provided as a unitary or one piece structure. Alternatively or in addition, the axle housing 40 may be provided without joints or connection interfaces that may utilize fasteners like bolts, thereby improving durability.

The differential carrier 42 may be mounted on the axle housing 40. For example, the differential carrier 42 may be mounted on the center portion 62 with a plurality of fasteners, such as bolts. In addition, the differential carrier 42 may support the differential 44. For instance, the differential 44 may be mounted on the differential carrier 42 such that the differential carrier 42 and differential 44 may be installed or removed as a unit, or installed together onto the axle housing 40 or removed together from the axle housing 40.

The differential 44 may be disposed in the axle housing 40. The differential 44 may be configured to transmit torque to the wheel mounts 20 and permit the wheel mounts 20 associated with each chain housing 22 to rotate at different velocities. An input shaft 70 is shown in FIG. 2 to facilitate an abbreviated discussion of the operation of the differential 44.

Figure 4:
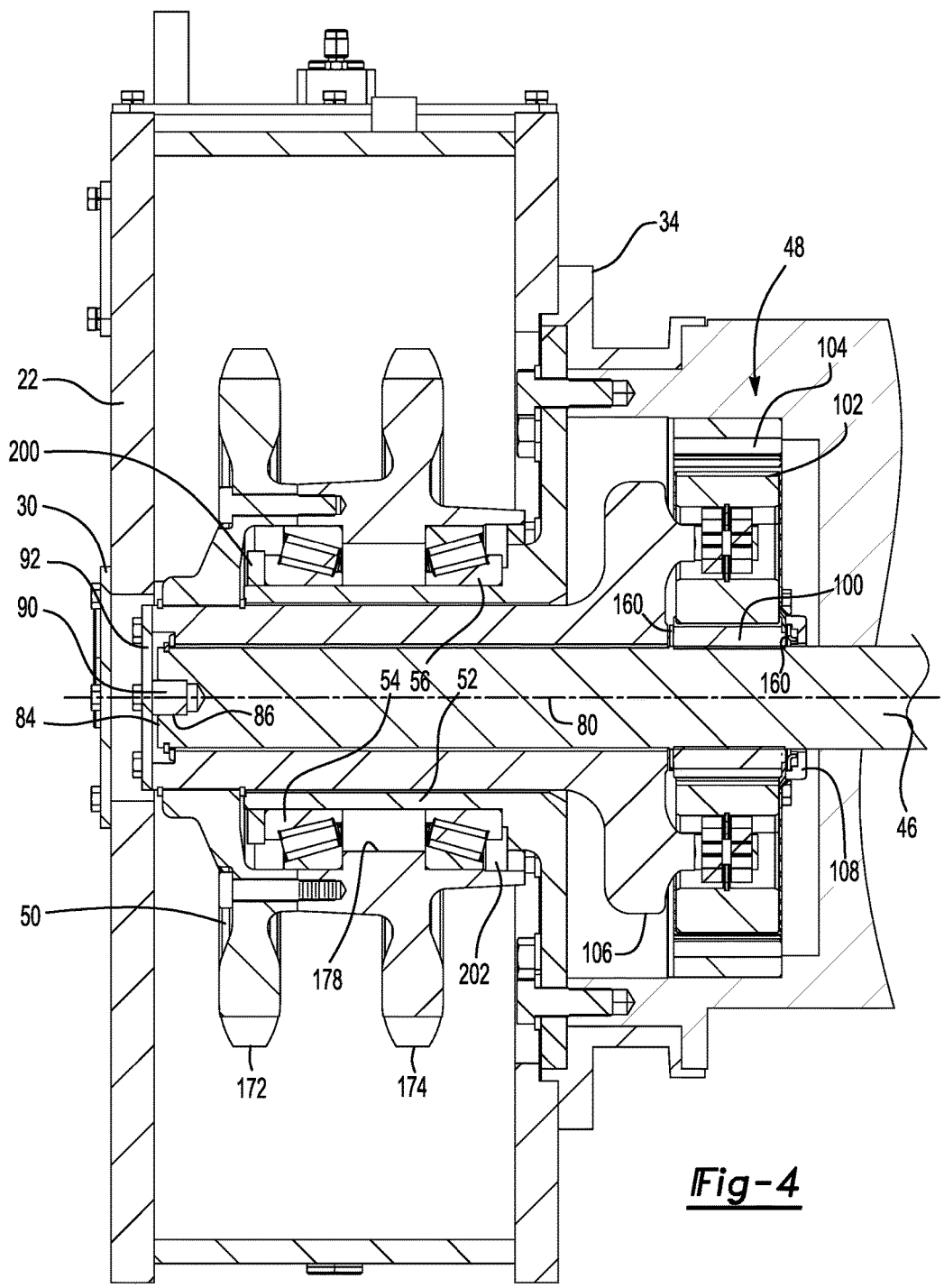
FIG. 4 is a section view of the bogie axle assembly along section line 4-4.
Figure 5:
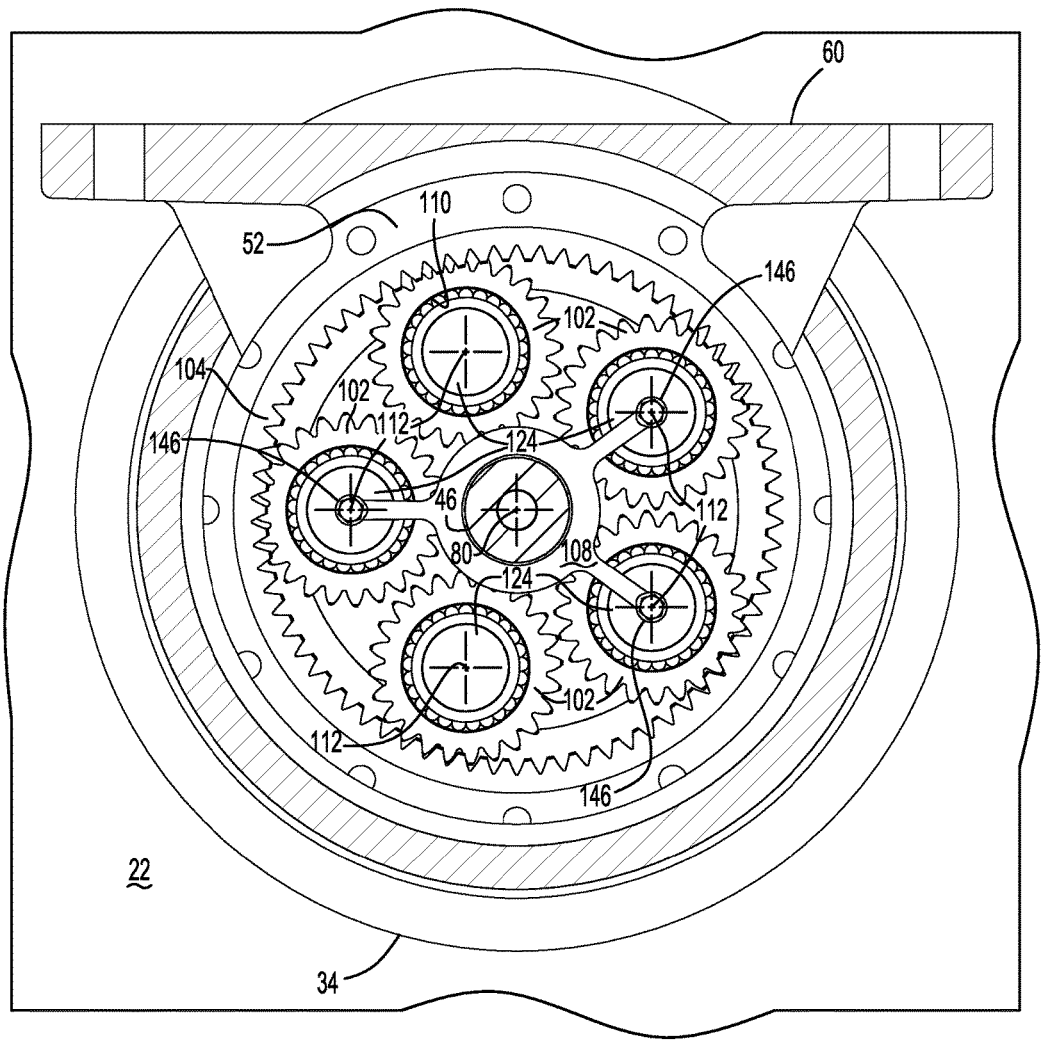
FIG. 5 is a section view of the bogie axle assembly along section line 5-5.

The input shaft 70 may facilitate coupling of the bogie axle assembly 24 to a torque source. For example, the input shaft 70 may be coupled to a vehicle drivetrain component, such as a drive shaft, that may be coupled to an output of a vehicle transmission or transfer case, which in turn may receive torque from a vehicle power source, such as an engine or motor. The input shaft 70 may be rotatably supported by one or more bearings that may be disposed in the differential carrier 42 and may be operatively connected to a gear, such as a pinion gear. The pinion gear may provide torque to a ring gear. The ring gear may transmit torque to a plurality of differential gears, which in turn may transmit torque to one or more output shafts. For example, a pair of output shafts may be provided with the bogie axle assembly 24. The output shafts may be spaced apart from each other and may extend in opposite directions from the differential 44. Each output shaft may be operatively connected to a corresponding axle shaft 46, which is best shown in FIGS. 3-5.

The axle shaft 46 may transmit torque from the differential 44 to a planetary gear set 48. The axle shaft 46 may be at least partially disposed in the axle housing 40 and may extend along and may be rotated about an axis 80 by the differential 44. The axle shaft 46 may extend through the planetary gear set 48. The axle shaft 46 may have a first end and a second end. The first end may be operatively connected to the differential 44. The second end may be disposed opposite the first end and may be disposed in the chain housing 22 near the axle access panel 30 as is best shown in FIG. 4. An axle shaft snap ring groove 82 may be disposed proximate the second end as is best shown in FIG. 3. The axle shaft snap ring groove 82 may extend around the axis 80 and may extend from an outside circumference of the axle shaft 46 toward the axis 80. In at least one embodiment, the second end may include an axle end surface 84 and an axle hole 86.

The axle end surface 84 may be disposed at an end of the axle shaft 46 that may be disposed in the chain housing 22. The axle end surface 84 may be disposed near an end of the drive sprocket unit 50 as is best shown in FIG. 4.

The axle hole 86 may extend from the axle end surface 84 and may be disposed along the axis 80. The axle hole 86 may receive a pin 90 that may extend from an axle cover 92. The axle cover 92 may be removably attached to another component of the bogie axle assembly 24 that may rotate about the axis 80, such as part of the planetary gear set 48 or the drive sprocket unit 50. The axle cover 92 may be attached in any suitable manner, such as with one or more fasteners like bolts. The axle access panel 30 and the axle cover 92 may be detached to provide access to the axle shaft 46, which may allow the axle shaft 46 to be accessed and removed from outside the chain housing 22, which in turn may allow the differential carrier 42 to be removed from the axle housing 40 for maintenance with limited disassembly of the bogie axle system 12.

The planetary gear set 48 may be disposed in the axle housing 40 and may be configured to provide a desired gear reduction ratio. The planetary gear set 48 may include a sun gear 100, a plurality of planet gears 102, a ring gear 104, a planet gear carrier 106, and a sun gear bracket 108.

The sun gear 100 may be disposed proximate the center of the planetary gear set 48. The sun gear 100 may also be disposed proximate and may engage the axle shaft 46 such that the sun gear 100 may rotate about the axis 80 with the axle shaft 46. The sun gear 100 may include a hole and a gear portion.

The hole may receive the axle shaft 46. In at least one embodiment, the hole may be a through hole that may extend through the sun gear 100. A spline may be provided on an interior surface or inside diameter of the sun gear 100 that may at least partially define the hole. The teeth of the spline may extend generally parallel to the axis 80 and may engage and mate with a similarly configured spline disposed on the exterior surface of the axle shaft 46 to inhibit rotation of the sun gear 100 with respect to the axle shaft 46.

The gear portion may be disposed on an exterior surface or outside diameter of the sun gear 100 that may be disposed opposite the axle shaft 46. The gear portion may include a set of teeth may be configured to engage and mesh with the planet gears 102.

The planet gears 102 be spaced apart from each other and may be rotatably disposed between the sun gear 100 and the ring gear 104. Each planet gear 102 may have a planet gear hole 110, which is best shown in FIG. 5, and a set of teeth. The planet gear hole 110 may be a through hole that may extend through the planet gear 102. The set of teeth may be disposed opposite the planet gear hole 110 and on an exterior surface or outside diameter of the planet gear 102. The set of teeth may mesh with teeth on the sun gear 100 and teeth on the ring gear 104. Each planet gear 102 may be configured to rotate about a different planet gear axis 112. The planet gear axes 112 may extend substantially parallel to the axis 80.

The ring gear 104 may be disposed proximate and may engage the axle housing 40. For example, the ring gear 104 may be disposed between the axle housing 40 and the planet gears 102. An outside circumference of the ring gear 104 may be disposed proximate and may engage the axle housing 40 in one or more embodiments. The ring gear 104 may be fixedly positioned with respect to the axle housing 40. In addition, the ring gear 104 may include a plurality of teeth that may be disposed around an inside diameter and may face toward the sun gear 100. The teeth on the ring gear 104 may mesh with teeth on the planet gears 102.

Referring to FIGS. 3-5, the planet gear carrier 106 may be coupled to the planet gears 102. The planet gear carrier 106 may be provided in various configurations. In the embodiment shown in FIG. 3, the planet gear carrier 106 may have a flange portion 120 and a tube portion 122.

The flange portion 120 may be disposed proximate the planetary gear set. The flange portion 120 may include a plurality of hubs 124 that may be operatively connected to corresponding planet gears 102. For example, a hub 124 may extend from the flange portion 120 and may be received in a corresponding planet gear hole 110 to help support and position a corresponding planet gear 102. A roller bearing may be disposed between a hub 124 and a corresponding planet gear 102 in one or more embodiments. The flange portion 120 may be radially disposed about the axis 80 and may extend further from the axis 80 than the tube portion 122.

The tube portion 122 may extend from the flange portion 120 and may extend axially away from the planet gears 102 and ring gear 104. The tube portion 122 may have an inner surface 130, an outer surface 132, and an end surface 134.

The inner surface 130 may at least partially define a planet gear carrier hole 136 through which the axle shaft 46 may extend. The inner surface 130 may be spaced apart from and may not engage the axle shaft 46. The inner surface 130 may be radially disposed with respect to the axis 80 in one or more embodiments.

The outer surface 132 may be disposed opposite the inner surface 130. The outer surface 132 may be disposed proximate and may engage the drive sprocket unit 50. One or more snap ring grooves 138 may be disposed proximate the second end. In the embodiment shown in FIG. 3, two snap ring grooves 138 are provided on opposite sides of the drive sprocket unit 50. Each snap ring groove 138 may extend around the axis 80 and may extend from the outer surface 132 toward the axis 80. In addition, each snap ring groove 138 may receive a corresponding snap ring 128 that may inhibit axial movement of the drive sprocket unit 50 with respect to the planet gear carrier 106.

The end surface 134 may be disposed at an end of the tube portion 122 that may be disposed opposite the flange portion 120. As such, the end surface 134 may be disposed proximate the axle cover 92. In the embodiment shown in FIG. 3, a recess 140 may extend from the end surface 134 toward the flange portion 120. The recess 140 may receive a snap ring 142 and a seal 144. The snap ring 142 may be received in the axle shaft snap ring groove 82 and may secure the seal 144. The seal 144 may be disposed between the snap ring 142 and the planet gear carrier 106. The seal 144 may engage the axle shaft 46 and the planet gear carrier 106 to inhibit contaminants from entering the planet gear carrier hole 136. The axle cover 92 may be disposed on the end surface 134 in one or more embodiments. For example, the axle cover 92 may be secured with one or more fasteners.

Figure 6:
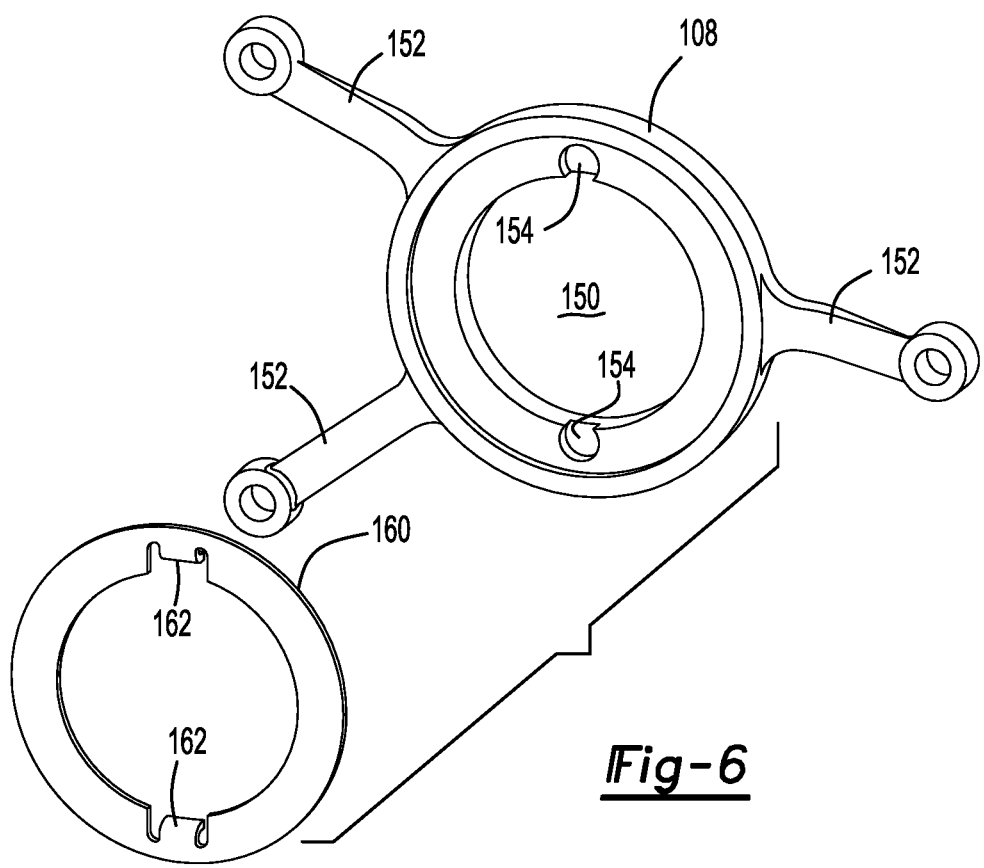
FIG. 6 is a perspective view of a sun gear bracket and thrust washer that may be provided with the bogie axle assembly.

Referring to FIGS. 5 and 6, the sun gear bracket 108 is shown in more detail. The sun gear bracket 108 may help inhibit axial movement of the sun gear 100 along the axle shaft 46 or movement of the sun gear 100 along the axis 80. The sun gear bracket 108 may be disposed on an opposite side of the planet gears 102 from the tube portion 122 of the planet gear carrier 106. In at least one embodiment, the sun gear bracket 108 may include a sun gear bracket opening 150, one or more arms 152, and one or more thrust washer alignment features 154.

The sun gear bracket opening 150 may be configured as a through hole that may extend through the sun gear bracket 108. The axle shaft 46 may extend through the sun gear bracket opening 150.

One or more arms 152 may extend away from the sun gear bracket opening 150. In the embodiment shown, three arms 152 are provided. The arms 152 may extend in a generally linear direction away from the axis 80 in one or more embodiments. Each arm 152 may be coupled to the planet gear carrier 106. For example, an arm 152 may have a hole that may receive a fastener 146 that may couple the arm 152 to a corresponding hub 124 of the planet gear carrier 106. The hole and or the fastener 146 may extend along a corresponding planet gear axis 112 in one or more embodiments.

A thrust washer alignment feature 154 may receive a portion of a thrust washer 160 that may be disposed between the sun gear bracket 108 and the sun gear 100. The thrust washer alignment feature 154 may be disposed on a side of the sun gear bracket 108 that may face toward the sun gear 100. In the embodiment shown in FIG. 6, two thrust washer alignment features 154 are shown; however, it is contemplated that a greater or lesser number of thrust washer alignment features 154 may be provided in one or more embodiments. The thrust washer alignment features 154 are shown with a female configuration; however, it is contemplated that the thrust washer alignment features 154 may have a male configuration or combinations of male and female configurations in one or more embodiments or may be omitted.

One or more thrust washers 160 may be provided to help inhibit axial movement of the sun gear 100, or movement of the sun gear 100 along the axle shaft 46 and axis 80. In the embodiment shown, thrust washers 160 are provided on opposite sides of the sun gear 100. One thrust washer 160 may be disposed between the sun gear 100 and the planet gear carrier 106. Another thrust washer 160 may be disposed between the sun gear 100 and the sun gear bracket 108. As is best shown in FIG. 6, the thrust washer 160 may be configured as a ring and may have one or more mating features 162 that may cooperate with the thrust washer alignment features 154 to position and/or help retain the thrust washer 160 with respect to the sun gear bracket 108.

Referring to FIGS. 3-5, the drive sprocket unit 50 may be disposed at an end of the bogie axle assembly 24 and may be received in the chain housing 22. The drive sprocket unit 50 may include one or more sprockets that may support and actuate a chain that may couple the drive sprocket unit 50 a sprocket of a corresponding wheel mount 20. It is also contemplated that the drive sprocket unit 50 may be connected to a wheel mount 20 with one or more gears rather than with a chain, in which case the drive sprocket unit 50 may have teeth that may be suitable for meshing with one or more gears that may transmit torque to one or more wheel mounts 20. The drive sprocket unit 50 may be fixedly disposed on the planet gear carrier 106 in any suitable manner, such as with mating splines or fasteners such as bolts, dowels, or combinations thereof. In one or more embodiments, the drive sprocket unit 50 may include a drive sprocket unit hole 170, an outer sprocket 172, and an inner sprocket 174.

The drive sprocket unit hole 170 may be a through hole that may extend through the drive sprocket unit 50. The drive sprocket unit hole 170 may be disposed along the axis 80. The axle shaft 46 and the planet gear carrier 106 may extend through the drive sprocket unit hole 170.

The outer sprocket 172 may have a plurality of sprocket teeth that may be arranged around the axis 80. The sprocket teeth may extend away from the axis 80 and be configured to engage a corresponding chain. The sprocket teeth of the outer sprocket 172 may be completely spaced apart from the sprocket teeth of the inner sprocket 174. Moreover, the sprocket teeth of the outer sprocket 172 may be disposed further from the axle housing 40 than the sprocket teeth of the inner sprocket 174. The outer sprocket 172 may be integrally formed with the inner sprocket 174 or the outer sprocket 172 and the inner sprocket 174 may be provided as separate components. In the embodiment shown in FIG. 3, the outer sprocket 172 and the inner sprocket 174 are provided as separate components that may be coupled to each other in any suitable manner, such as with one or more fasteners 176 like bolts. In such a configuration, the outer sprocket 172 may be fixedly coupled to the planet gear carrier 106, such as with the snap rings 128 and/or mating splines.

The inner sprocket 174 may be disposed between the outer sprocket 172 and the axle housing 40. The inner sprocket 174 may have a plurality of sprocket teeth that may be arranged around the axis 80 and that may have a similar configuration to the sprocket teeth of the outer sprocket 172. The sprocket teeth may extend away from the axis 80 and be configured to engage a different chain than the outer sprocket 172.

The drive sprocket unit 50 may optionally include a bearing positioning feature 178. The bearing positioning feature 178 may help position and may help inhibit axial movement of the first roller bearing assembly 54 and/or the second roller bearing assembly 56. The bearing positioning feature 178 may be configured as a protrusion that may extend from an inside surface of the drive sprocket unit 50 that may face toward and may extend around the axis 80. In at least one embodiment, the bearing positioning feature 178 may engage and may separate the first roller bearing assembly 54 from the second roller bearing assembly 56. The bearing positioning feature 178 may be provided with the inner sprocket 174 in one or more embodiments.

The spindle 52 may be fixedly positioned on the axle housing 40 or with respect to the axle housing 40. In addition, the spindle 52 may be configured to help position and/or support the first roller bearing assembly 54 and/or the second roller bearing assembly 56. The spindle 52 may be mounted to the axle housing 40 in any suitable manner, such as with one or more fasteners like bolts. In at least one embodiment, spindle 52 may extend from the axle housing 40 into the chain housing 22 and may include a mounting flange 180, a spindle tube portion 182, and a spindle hole 184.

The mounting flange 180 may facilitate coupling of the spindle 52 to the axle housing 40. The mounting flange 180 may include a plurality of fastener holes that may receive one or more fasteners 176a, such as bolts, that may couple the mounting flange 180 to the axle housing 40. The mounting flange 180 may extend around the axis 80 and may extend further from the axis 80 than the spindle tube portion 182.

The spindle tube portion 182 may extend from the mounting flange 180 and may extend axially away from the planet gears 102 and ring gear 104. The spindle tube portion 182 may have an inner spindle surface 190, an outer spindle surface 192, and a spindle end surface 194.

The inner spindle surface 190 may at least partially define the spindle hole 184 through which the axle shaft 46 and the tube portion 122 of the planet gear carrier 106 may extend. The inner spindle surface 190 may be spaced apart from and may not engage the planet gear carrier 106 to allow the planet gear carrier 106 and drive sprocket unit 50 to rotate about the axis 80 and rotate with respect to the spindle 52. The inner spindle surface 190 may be radially disposed with respect to the axis 80 in one or more embodiments.

The outer spindle surface 192 may be disposed opposite the inner spindle surface 190. The outer spindle surface 192 may be disposed proximate and may engage the first roller bearing assembly 54 and the second roller bearing assembly 56.

The spindle end surface 194 may be disposed at an end of the spindle tube portion 182 that may be disposed opposite the mounting flange 180. As such, the spindle end surface 194 may be disposed proximate the drive sprocket unit 50 or between the tube portion 122 of the planet gear carrier 106 and the outer sprocket 172. The spindle end surface 194 may be spaced apart from and may not engage the drive sprocket unit 50.

A bearing retaining feature 200 may be disposed proximate the outer spindle surface 192 and/or the spindle end surface 194. The bearing retaining feature 200 may be disposed proximate and may engage the first roller bearing assembly 54 to inhibit axial movement of the first roller bearing assembly 54 away from the second roller bearing assembly 56, or to the left from the perspective shown in FIG. 4. The bearing retaining feature 200 may be coupled to the spindle 52 between the outer sprocket 172 and the first roller bearing assembly 54 or between the spindle end surface 194 and the first roller bearing assembly 54. The bearing retaining feature 200 may have any suitable configuration. For example, the bearing retaining feature 200 may be configured as a nut that may have a hole that may receive and engage the spindle tube portion 182.

A seal 202 may be provided between the spindle 52 and the drive sprocket unit 50. The seal 202 may be disposed between the second roller bearing assembly 56 and the mounting flange 180 and may extend from the spindle 52 to the drive sprocket unit 50. The seal 202 may help inhibit contaminants from passing between the drive sprocket unit 50 and the spindle 52 and reaching the first roller bearing assembly 54 and/or the second roller bearing assembly 56.

The first roller bearing assembly 54 may rotatably support the drive sprocket unit 50. The first roller bearing assembly 54 may be disposed on the spindle 52 and may extend from the spindle 52 to the drive sprocket unit 50. The first roller bearing assembly 54 may be axially positioned further from the mounting flange 180 than the second roller bearing assembly 56. For example, the first roller bearing assembly 54 may be positioned between the outer sprocket 172 and the inner sprocket 174.

The second roller bearing assembly 56 may also rotatably support the drive sprocket unit 50. The second roller bearing assembly 56 may be spaced apart from the first roller bearing assembly 54. The second roller bearing assembly 56 may extend from the spindle 52 to the drive sprocket unit 50. The second roller bearing assembly 56 may be axially positioned between the first roller bearing assembly 54 and the mounting flange 180 of the spindle 52. For example, the second roller bearing assembly 56 may be positioned between the inner sprocket 174 and the mounting flange 180.

Figure 7:
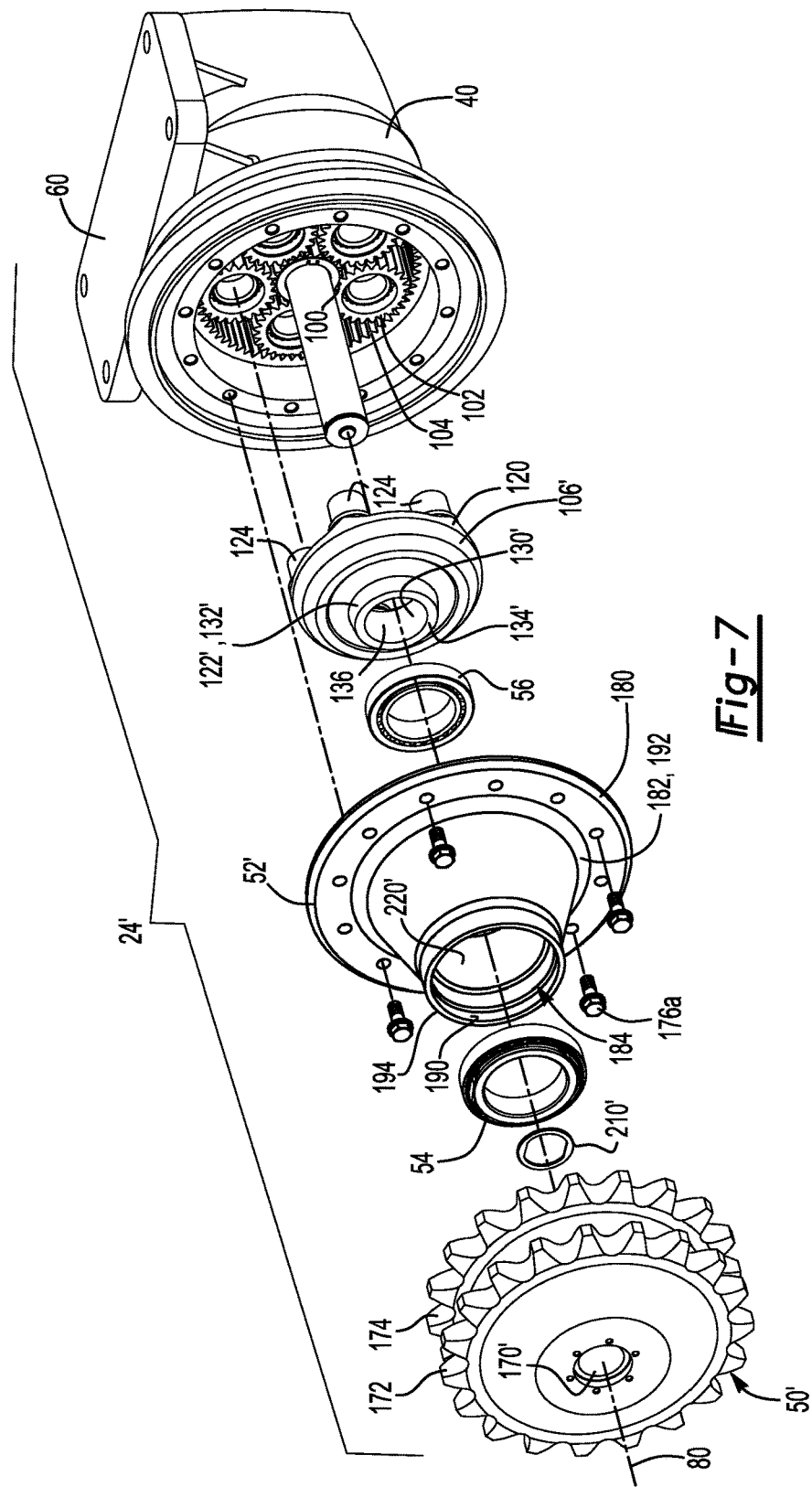
FIG. 7 is an exploded view of a second embodiment of a bogie axle assembly.
Figure 8:
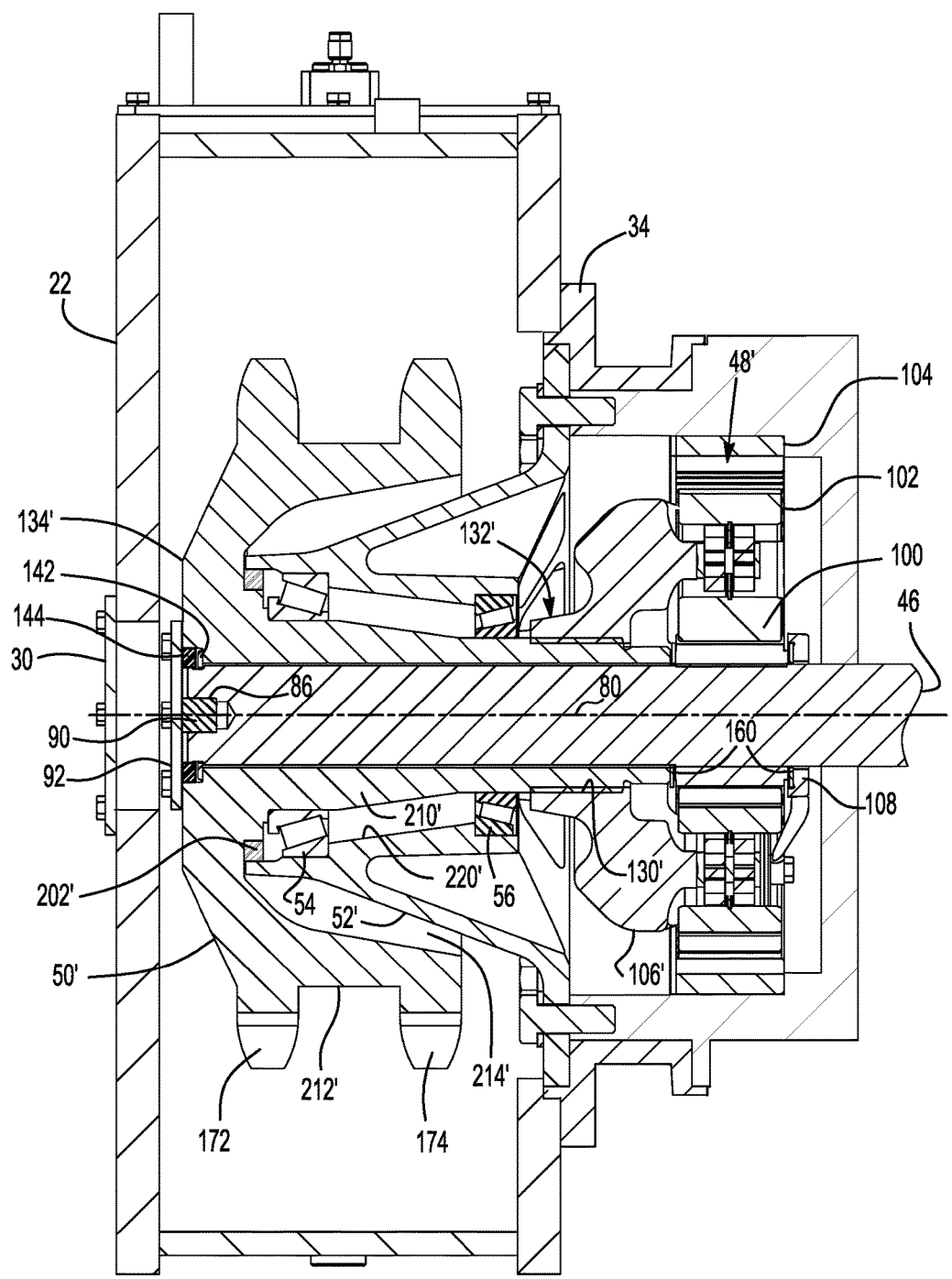
FIG. 8 is a section view of the bogie axle assembly of FIG. 7.

Referring to FIGS. 7 and 8, a second embodiment of a bogie axle assembly 24' is shown. In this embodiment, the bogie axle assembly 24' includes an axle housing 40, differential carrier 42, differential 44, axle shaft 46, first roller bearing assembly 54, and a second roller bearing assembly 56 that may be the same as or substantially similar to those of the bogie axle assembly 24. The bogie axle assembly 24' may include a planetary gear set 48', drive sprocket unit 50', and spindle 52' that may differ from the corresponding components of the bogie axle assembly 24.

The planetary gear set 48' may include a sun gear 100, a plurality of planet gears 102, a ring gear 104, and a sun gear bracket 108 as previously described. In this embodiment, the planet gear carrier 106' may have a flange portion 120 and a tube portion 122' that may have a shorter axial length than tube portion 122. For example, the tube portion 122' may have an inner surface 130', an outer surface 132', and an end surface 134'.

The inner surface 130' may at least partially define a planet gear carrier hole 136 through which the axle shaft 46 and the drive sprocket unit 50' may extend. The inner surface 130 may be spaced apart from and may not engage the axle shaft 46, but may extend around and receive a portion of the drive sprocket unit 50'. As such, the drive sprocket unit 50' may be received in and may be fixedly coupled to the inner surface 130', such as with mating splines.

The outer surface 132' may be disposed opposite the inner surface 130', but may be spaced apart from and may not be coupled to the drive sprocket unit 50'.

The end surface 134' may be disposed at an end of the tube portion 122' and may extend from the inner surface 130' to the outer surface 132'. The end surface 134' may be disposed between the drive sprocket unit 50' and the spindle 52' but may not extend completely through the drive sprocket unit 50'. Instead, the end surface 134' may be disposed proximate and may engage the second roller bearing assembly 56 and may inhibit axial movement of the second roller bearing assembly 56 toward the axle housing 40, or to the right from the perspective shown in FIG. 8.

The drive sprocket unit 50' may be disposed at an end of the bogie axle assembly 24' and may be received in the chain housing 22. The drive sprocket unit 50' may include one or more sprockets that may support and actuate a chain that may couple the drive sprocket unit 50 a sprocket of a corresponding wheel mount 20. The drive sprocket unit 50' may be fixedly disposed on the planet gear carrier 106' in may be received in the planet gear carrier hole 136. The drive sprocket unit 50' may include a drive sprocket unit hole 170', an outer sprocket 172, an inner sprocket 174, as well as a first portion 210' and a second portion 212'.

The drive sprocket unit hole 170' may be a through hole that may extend through the drive sprocket unit 50'. The drive sprocket unit hole 170' may be disposed along the axis 80. The axle shaft 46 may extend through the drive sprocket unit hole 170', but the planet gear carrier 106' may not be disposed in the drive sprocket unit hole 170'.

The outer sprocket 172 and inner sprocket 174 may each have sets of sprocket teeth as previously discussed. The outer sprocket 172 may be integrally formed with the inner sprocket 174 or the outer sprocket 172 and the inner sprocket 174 may be provided as separate components. In the embodiment shown in FIG. 7, the outer sprocket 172 and the inner sprocket 174 are illustrated with an integrally formed configuration.

The first portion 210' may define the drive sprocket unit hole 170' that may receive the axle shaft 46. The axle shaft 46 may extend through the drive sprocket unit hole 170'. A snap ring 142 may be received in the axle shaft snap ring groove 82 and may help secure the seal 144 against the axle shaft 46 and the drive sprocket unit 50'. The axle cover 92 may be disposed at an end of the drive sprocket unit 50' and may be secured to the drive sprocket unit 50' with one or more fasteners.

The second portion 212' may extend outwardly from the first portion 210' or away from the axis 80. The second portion 212' may include the outer sprocket 172 and/or the inner sprocket 174. The first portion 210' and the second portion 212' may cooperate to define a cavity 214' that may be disposed between the first portion 210' and the second portion 212'. The cavity 214' may be a ring-shaped cavity that may extend around the axis 80 and may be open in a direction that faces toward the axle housing 40.

The spindle 52' may be fixedly positioned on the axle housing 40 or fixedly positioned with respect to the axle housing 40. In addition, the spindle 52' may be configured to help position and/or support the first roller bearing assembly 54 and/or the second roller bearing assembly 56. The spindle 52' may be mounted to the axle housing 40 in any suitable manner, such as with one or more fasteners 176a like bolts as previously discussed. In at least one embodiment, spindle 52' may extend from the axle housing 40 into the cavity 214' of the drive sprocket unit 50' and into the chain housing 22. The spindle 52' and may include a mounting flange 180, a spindle tube portion 182, and a spindle hole 184 similar to the features previously discussed. The spindle hole 184 may receive the drive sprocket unit 50'.

The spindle tube portion 182 may have an inner spindle surface 190, an outer spindle surface 192, and a spindle end surface 194.

The inner spindle surface 190 may at least partially define the spindle hole 184 through which the axle shaft 46 and the first portion 210' of the drive sprocket unit 50' may extend. Optionally, the planet gear carrier 106' may also extend into the spindle hole 184 such that the planet gear carrier 106' may be disposed between the drive sprocket unit 50' and the spindle 52'. The inner spindle surface 190 may be spaced apart from and may not engage the planet gear carrier 106' or the first portion 210' to allow the planet gear carrier 106' and drive sprocket unit 50' to rotate about the axis 80 and rotate with respect to the spindle 52'. The inner spindle surface 190 may be disposed proximate and may engage the first roller bearing assembly 54 and the second roller bearing assembly 56.

A bearing positioning feature 220' may be provided on the inner spindle surface 190 that may help position and may help inhibit axial movement of the first roller bearing assembly 54 and/or the second roller bearing assembly 56. The bearing positioning feature 220' may be configured as a protrusion that may extend from the inner spindle surface 190 toward the axis 80. The bearing positioning feature 220' may engage and may separate the first roller bearing assembly 54 from the second roller bearing assembly 56.

The first roller bearing assembly 54 may be disposed in the cavity 214' on the first portion 210' of the drive sprocket unit 50'. The first portion 210' of the drive sprocket unit 50' may be disposed between the axle shaft 46 and the spindle 52'. The first roller bearing assembly 54 may be disposed between the first portion 210' and the spindle 52'.

The second roller bearing assembly 56 may be spaced apart from the first roller bearing assembly 54. The second roller bearing assembly 56 may be disposed adjacent to or may be received in the cavity 214'. The second roller bearing assembly 56 may be disposed on the drive sprocket unit 50' and may extend away from the axis 80. As such, the second roller bearing assembly 56 may extend from the first portion 210' to the inner spindle surface 190. The second roller bearing assembly 56 may be axially positioned between the first roller bearing assembly 54 and the end surface of the planet gear carrier 106' such that the planet gear carrier 106' may inhibit axial movement of the second roller bearing assembly 56.

The spindle end surface 194 may be disposed at an end of the spindle tube portion 182 that may be disposed opposite the mounting flange 180. As such, the spindle end surface 194 may be disposed proximate the drive sprocket unit 50 or between the tube portion 122 of the planet gear carrier 106 and the outer sprocket 172. The spindle end surface 194 may be spaced apart from and may not engage the drive sprocket unit 50.

A seal 202' may be provided in the cavity 214' between the spindle 52' and the drive sprocket unit 50. The seal 202' may be disposed near the outer sprocket 172 and the end of the spindle 52' and may extend from the inner spindle surface 190 of the spindle 52' to the drive sprocket unit 50'. As such, the first roller bearing assembly 54 may be disposed between the seal 202' and the second roller bearing assembly 56 and the seal 202' may be disposed between the first roller bearing assembly 54 and the second portion 212' of the drive sprocket unit 50'. The seal 202' may help inhibit contaminants from passing between the drive sprocket unit 50' and the spindle 52' and reaching the first roller bearing assembly 54 and/or the second roller bearing assembly 56.

A bogie axle system may be easier to service or repair when configured with the bogie axle assemblies previously discussed. For example, the bogie axle assemblies may allow the axle shafts to be removed so that the differential carrier and differential may be removed from the axle housing with little disassembly of other components. In addition, the planetary gear set may be accessed for maintenance by removing a corresponding chain housing but does not require removal of a bogie axle assembly from the chain housing, which may be beneficial given the size and weight of a bogie axle system and a bogie axle assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bogie axle assembly comprising:
   an axle housing;
   an axle shaft that is disposed in the axle housing and rotates about an axis;
   a planetary gear set disposed in the axle housing, the planetary gear set including:
      a sun gear disposed proximate the axle shaft;
      a ring gear disposed proximate the axle housing;
      a plurality of planet gears disposed between the sun gear and the ring gear; and
      a planet gear carrier that is coupled to the plurality of planet gears, the planet gear carrier having a planet gear carrier hole through which the axle shaft extends;
   a drive sprocket unit that is fixedly disposed on the planet gear carrier, the drive sprocket unit including an inner sprocket and an outer sprocket; an axle cover that is secured to the drive sprocket unit, wherein the axle cover has a pin that is received in an axle hole that extends from an axle end surface of the axle shaft;
   a spindle that is fixedly disposed on the axle housing, the spindle having a spindle hole that receives the drive sprocket unit; and
   a first roller bearing assembly that is disposed on the spindle and rotatably supports the drive sprocket unit.

2. The bogie axle assembly of claim 1 wherein the drive sprocket unit is disposed in the planet gear carrier hole.

3. The bogie axle assembly of claim 1 wherein the planet gear carrier extends into the spindle hole such that the drive sprocket unit is disposed in the planet gear carrier hole and the planet gear carrier is disposed between the drive sprocket unit and the spindle.

4. The bogie axle assembly of claim 1 wherein the axle shaft extends through a drive sprocket unit hole of the drive sprocket unit.

5. The bogie axle assembly of claim 1 wherein the drive sprocket unit has a first portion that defines a drive sprocket unit hole that receives the axle shaft, a second portion that extends from the first portion and includes the inner sprocket and the outer sprocket, and a cavity that is disposed between the first portion and the second portion.

6. The bogie axle assembly of claim 5 wherein the first roller bearing assembly is disposed in the cavity and on the first portion of the drive sprocket unit.

7. The bogie axle assembly of claim 5 further comprising a seal that is disposed in the cavity and that extends from the spindle to the drive sprocket unit and that is disposed between the first roller bearing assembly and the second portion of the drive sprocket unit.

8. The bogie axle assembly of claim 5 further comprising a second roller bearing assembly that is spaced apart from the first roller bearing assembly and extends from the first portion to the spindle.

9. The bogie axle assembly of claim 8 wherein the second roller bearing assembly is axially positioned between the first roller bearing assembly and the planet gear carrier such that the planet gear carrier inhibits axial movement of the second roller bearing assembly.

10. A bogie axle assembly comprising:
    an axle housing;
    an axle shaft that is disposed in the axle housing and rotates about an axis;
    a planetary gear set disposed in the axle housing, the planetary gear set including:
       a sun gear disposed proximate the axle shaft;
       a ring gear disposed proximate the axle housing;
       a plurality of planet gears disposed between the sun gear and the ring gear; and
       a planet gear carrier that is coupled to the plurality of planet gears, the planet gear carrier having a planet gear carrier hole through which the axle shaft extends;
    a drive sprocket unit that is fixedly disposed on the planet gear carrier, the drive sprocket unit including an inner sprocket and an outer sprocket;

a spindle that is fixedly disposed on the axle housing, the spindle having a spindle hole that receives the drive sprocket unit;

a first roller bearing assembly that is disposed on the spindle and rotatably supports the drive sprocket unit; and a sun gear bracket that has a sun gear bracket opening through which the axle shaft extends and a plurality of arms that are coupled to the planet gear carrier, wherein the sun gear bracket inhibits axial movement of the sun gear along the axle shaft.

11. The bogie axle assembly of claim 10 further comprising an axle cover that is secured to the drive sprocket unit, wherein the axle cover has a pin that is received in an axle hole that extends from an axle end surface of the axle shaft.

12. The bogie axle assembly of claim 10 wherein the axle shaft extends through a drive sprocket unit hole of the drive sprocket unit.

13. The bogie axle assembly of claim 10 wherein the drive sprocket unit has a first portion that defines a drive sprocket unit hole that receives the axle shaft, a second portion that extends from the first portion and includes the inner sprocket and the outer sprocket, and a cavity that is disposed between the first portion and the second portion.

14. The bogie axle assembly of claim 13 wherein the first roller bearing assembly is disposed in the cavity and on the first portion of the drive sprocket unit.

15. The bogie axle assembly of claim 13 further comprising a seal that is disposed in the cavity and that extends from the spindle to the drive sprocket unit and that is disposed between the first roller bearing assembly and the second portion of the drive sprocket unit.

16. The bogie axle assembly of claim 13 further comprising a second roller bearing assembly that is spaced apart from the first roller bearing assembly and extends from the first portion to the spindle.

17. The bogie axle assembly of claim 16 wherein the second roller bearing assembly is axially positioned between the first roller bearing assembly and the planet gear carrier such that the planet gear carrier inhibits axial movement of the second roller bearing assembly.

18. A bogie axle assembly comprising:

an axle housing;

an axle shaft that is disposed in the axle housing and rotates about an axis;

a planetary gear set disposed in the axle housing, the planetary gear set including:
  a sun gear that engages the axle shaft and does not rotate with respect to the axle shaft;
  a ring gear disposed proximate the axle housing;
  a plurality of planet gears disposed between the sun gear and the ring gear; and
  a planet gear carrier that is coupled to the plurality of planet gears, the planet gear carrier having a planet gear carrier hole through which the axle shaft extends;

a drive sprocket unit that is fixedly disposed on the planet gear carrier, the drive sprocket unit including an inner sprocket and an outer sprocket; wherein the axle shaft extends completely through and is spaced apart from the drive sprocket unit;

a spindle that is fixedly disposed on the axle housing, the spindle having a spindle hole that receives the drive sprocket unit; and a first roller bearing assembly that is disposed on the spindle and rotatably supports the drive sprocket uni.

19. The bogie axle assembly of claim 18 wherein a seal is disposed proximate an end of the axle shaft and extends from the axle shaft to the drive sprocket unit.

20. The bogie axle assembly of claim 19 wherein the seal is disposed in the drive sprocket unit and extends from an axle cover that that is secured to the drive sprocket unit and that is disposed adjacent to an axle end surface of the axle shaft.

* * * * *

UNITED STATES PATENT AND TRADEMARK OFFICE
CERTIFICATE OF CORRECTION

PATENT NO. : 10,330,184 B2
APPLICATION NO. : 15/635782
DATED : June 25, 2019
INVENTOR(S) : I-Chao Chung et al.

It is certified that error appears in the above-identified patent and that said Letters Patent is hereby corrected as shown below:

In the Claims

Column 14, Lines 35-36, Claim 20:
After "extends from an axle cover that"
Delete "that" (second occurrence)

Signed and Sealed this
Twenty-sixth Day of November, 2019

Andrei Iancu
*Director of the United States Patent and Trademark Office*